United States Patent
Bugaj et al.

(10) Patent No.: US 9,286,297 B1
(45) Date of Patent: Mar. 15, 2016

(54) SYSTEM AND METHOD FOR FLEXIBLE PATH HANDLING

(75) Inventors: Stephan Vladimir Bugaj, San Pablo, CA (US); Brett Levin, San Francisco, CA (US); Zachariah Journey Baum, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 12/967,737

(22) Filed: Dec. 14, 2010

Related U.S. Application Data

(63) Continuation of application No. 11/115,987, filed on Apr. 26, 2005, now Pat. No. 7,873,685.

(60) Provisional application No. 60/571,229, filed on May 13, 2004.

(51) Int. Cl.
*G06F 17/30* (2006.01)

(52) U.S. Cl.
CPC ................. *G06F 17/30067* (2013.01)

(58) Field of Classification Search
CPC ............... G06T 17/3089; G06T 13/00; G06T 17/30067; H04L 67/02
See application file for complete search history.

(56) References Cited

U.S. PATENT DOCUMENTS

| | | | |
|---|---|---|---|
| 5,008,820 A * | 4/1991 | Christopher et al. | |
| 6,065,010 A * | 5/2000 | Otsuka et al. | |
| 6,226,792 B1 * | 5/2001 | Goiffon et al. | 717/120 |
| 6,278,452 B1 | 8/2001 | Huberman et al. | |
| 6,278,466 B1 | 8/2001 | Chen | |
| 6,330,567 B1 * | 12/2001 | Chao | 707/758 |
| 6,573,898 B1 | 6/2003 | Mathur et al. | |
| 7,240,292 B2 * | 7/2007 | Hally et al. | 715/778 |
| 7,287,032 B2 | 10/2007 | Attili et al. | |
| 7,290,008 B2 * | 10/2007 | Balva et al. | 707/756 |
| 7,322,024 B2 | 1/2008 | Carlson et al. | |
| 7,562,084 B2 * | 7/2009 | Markel et al. | |
| 7,684,976 B2 * | 3/2010 | Nakayama | 704/10 |
| 7,873,685 B2 | 1/2011 | Bugaj et al. | |
| 8,024,335 B2 * | 9/2011 | Anthony et al. | 707/729 |
| 8,346,717 B1 * | 1/2013 | Mensch et al. | 707/609 |
| 2002/0002607 A1 * | 1/2002 | Ludovici et al. | 709/223 |
| 2003/0018661 A1 * | 1/2003 | Darugar | 707/500 |
| 2003/0140115 A1 * | 7/2003 | Mehra | 709/217 |
| 2003/0140227 A1 * | 7/2003 | Asano et al. | 713/157 |
| 2003/0140308 A1 * | 7/2003 | Murthy et al. | 715/500 |
| 2003/0177118 A1 * | 9/2003 | Moon et al. | 707/5 |
| 2004/0193621 A1 * | 9/2004 | Moore et al. | 707/100 |
| 2005/0050537 A1 * | 3/2005 | Thompson et al. | 717/165 |

(Continued)

OTHER PUBLICATIONS

Cook et al., "The Reyes Image Rendering Architecture," Computer Graphics, vol. 21, No. 4, 1987, pp. 95-102.

(Continued)

*Primary Examiner* — Polina Peach
(74) *Attorney, Agent, or Firm* — Kilpatrick Townsend & Stockton LLP

(57) ABSTRACT

A method for a computer system includes receiving a mapping schema between a plurality of asset-types within an asset-type hierarchy and a plurality of paths within an on-disk storage structure, receiving an asset-type definition list from a user, wherein the asset-type definition list comprises an asset-type from the plurality of asset types, and determining at least one path from the plurality of paths for providing access to assets of the asset-type in response to the mapping schema and the asset-type definition list.

20 Claims, 4 Drawing Sheets

(56) References Cited

U.S. PATENT DOCUMENTS

| | | | |
|---|---|---|---|
| 2005/0160153 A1* | 7/2005 | Knutson et al. | 709/217 |
| 2006/0015431 A1 | 1/2006 | Bugaj et al. | |
| 2006/0129745 A1* | 6/2006 | Thiel et al. | 711/100 |
| 2006/0190814 A1* | 8/2006 | Collie et al. | 715/513 |
| 2007/0043702 A1* | 2/2007 | Lakshminarayanan et al. | 707/3 |

OTHER PUBLICATIONS

International Search Report, dated Jun. 19, 2008, for International Patent Application No. PCT/US05/15634, filed May 4, 2005, 3 pages.

Written Opinion dated, dated Jun. 19, 2008, for International Patent Application No. PCT/US05/15634, filed May 4, 2005, 6 pages.

* cited by examiner

SYSTEM AND METHOD FOR FLEXIBLE PATH HANDLING

CROSS-REFERENCES TO RELATED APPLICATIONS

This application is a continuation application of and claims priority from U.S. Nonprovisional patent application Ser. No. 11/115,987 filed Apr. 26, 2005, which claims priority from and is a non-provisional of U.S. Provisional Patent Application No. 60/571,229, filed May 13, 2004, and the entire disclosures of these applications are incorporated herein by reference for all purposes. The present application also incorporates by reference for all purposes U.S. patent application Ser. No. 10/810,487, filed Mar. 26, 2004 (now U.S. Pat. No. 7,548,243).

BACKGROUND OF THE INVENTION

The present invention relates to asset management systems. More particularly, the present invention relates to methods and apparatus for mapping between an asset name and type, and an on-disk file location. Some embodiments provide a centralized configuration, standard code libraries, and a callable executable to allow assets to be located on-disk based on name, type, and search parameters, rather than hard-coded asset path fragments.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with the arrangements, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), and others. In addition to creating animated features, Pixar developed computing platforms specially designed for CA, and CA software now known as RenderMan®. RenderMan® was particularly well received in the animation industry and recognized with two Academy Awards®. RenderMan® renders images based upon conceptual "software assets" including geometric scene descriptors including references to object models.

Typically, scenes to be rendered are specified (assembled) by one or more users (e.g. animators, lighters, etc.). These scenes include descriptions of the objects, camera angles, lighting sources, and the like. The scene data file (also known as a scene descriptor file) that describes the entire scene is typically very large, on the order of gigabytes. Because the sizes of typical scene descriptor files are typically large, Pixar developed an internal technique for segmenting a scene descriptor file from one large file into a series of smaller files. As described in the co-pending application described above, Pixar developed and used the concept of "hook set" files and references to "hook files" to describe a scene. Hook files may include geometric object data, shader dada, lighting data, and the like. Accordingly, a typical scene is actually composed of a number of separate data files. Generally, logical assets, such as a scene, a shot (a group of scenes), an object, and the like are now themselves composed of any number of separate assets.

The inventors of the present invention have recognized that when rendering a lengthy animated feature, such as a feature film, hundreds to thousands of assets, e.g. scene descriptor files, hook files, object and the like, need to be retrieved from memory efficiently.

One method considered by the inventors to provide access to assets has been the storage and retrieval of assets from hard-coded directory structures. As an example, a rigid directory structure is first created to store assets, and when a particular asset is required, the appropriate directory in the directory structure is accessed for that asset. In such examples, hard-coded asset paths may use variable substitution, such as "/foo/bar/$name," where "$name" is the asset name stored in directory "/foo/bar."

The inventors had determined that drawbacks to these methods includes that the scene descriptor file, or the like must be manually updated when the asset directory structure changes. For example when a reference to "/foo/bar" should be changed to "foo/bar1" due to a version update, files with references to "/foo/bar" must be manually updated to refer to "foo/bar1."

Another method considered by the inventors to provide access to assets has been with operating system environmental variables path search lists, such as UNIX PATH format. The inventors have determined a number of drawbacks to such methods including that, new variables would have to be established for each new type mapping. Other drawbacks includes that search methods would typically be performed linearly through the list until a name match is made, which would be inefficient. Other drawbacks include that without a type hierarchy, there would be no way to specify more than one level of type refinement in a search without creating a compound type. Still other drawbacks include that environment variables are often managed by the operating system and outside direct control of the users. Further, the operating system would have to be rebooted when the user changes working environments.

Accordingly what is desired are improved method and apparatus for asset management, without the drawbacks described above.

BRIEF SUMMARY OF THE INVENTION

The present invention relates to asset management systems. More particularly, the present invention relates to methods and apparatus for mapping between an asset name and type, and an on-disk file location. Embodiments of the present invention provide a centralized configuration, standard code libraries, and a callable executable to allow assets to be located on-disk based on name, type, and search parameters, rather than hard-coded asset path fragments.

An overarching design goal of a flexible path handling system described in embodiments of the present invention is to store and retrieve assets based upon a hierarchal data structure that makes sense to a user workflow, and not necessarily a hard-disk structure. Accordingly, a configurable mapping between assets e.g. element (character, shot, etc.) types or asset (model, shader, etc.) types and the directory paths that they reside in is desired.

In some embodiments of the present invention, one such configurable mapping is for toolpaths. With the toolpaths mechanism, a configuration file can be used to set the global UNITTREE. For example, "user/anim/running" could be changed to "shows/running" Additional, the toolpath mechanism may be used to set the production and shot element directories below the UNITTREE, and set the model, shader, etc. asset paths relative to production and shots (as well as in global directories). In various embodiments, toolpaths exist for a variety of asset types (.mdl models, .sl shaders, etc.), and modeling environments and other tools and scripts search for files of the appropriate type in the paths returned by the toolpaths script.

In various embodiments, toolpaths may return one or more complete path strings. In such embodiments, to get subpath data, either the toolpath must define the subpath, or the subpath would require prior knowledge as to the directory structure. Additionally, in some embodiments, toolpaths are run as a program to reduce overhead.

In light of the above, in various embodiments of the present invention, a configuration file is provided to define both new structure for existing assets as well as new path variables to support new types of assets and workflow. Additional stand-alone executable programs may include APIs that return paths based upon asset data and may provide hierarchal lists based upon paths.

Various embodiments of the present invention provide one or more of the following advantages:

a) A centralized configuration file, encoded in the XML standard, which allows hierarchal mappings between on-disk structure and type to be established for one or more asset trees of potentially different structure.

b) Ability to handle compound and aggregate assets, and still reference sub-assets, using hierarchal definitions. Complex assets can therefore use singly rooted on-disk storage, instead of spreading sub-assets out over parallel paths so that a one-level type system can handle them.

c) Precedence of conceptual asset type over on-disk path allows for data-oriented workflow tools to be created without codifying an on-disk structure in the tools.

d) Configurable search defaults per-type, per-asset-tree allows some asset collections to be searched top-down, some bottom-up, or at a single level.

e) Ability to query assets by passing in names or wildcards for levels of the type hierarchy above that asset. This can be done without modifying environment variables. For example, in a film production system it is possible to ask for all shaders named "foo" which belong to characters of any name, in movie "A" or "B". This can be done without explicit path construction in the code, or restarting the program after changing environment variables.

f) Ability to request asset paths using code libraries in C/C++, Python, Perl, TCL, and csh, or as a callable executable from other languages, on the command-line, or from other programs that can accept a path from a remotely called executable.

g) Reverse operation: given a path, return the type (and also the hierarchy, if desired).

h) Make code reuse across multiple productions much more viable.

Embodiments of the present invention provide one or more of the following features:

a) Precedence of conceptual asset type over on-disk path allowing for data-oriented workflow.

b) Hierarchal, type-based asset referencing in an on-disk system.

c) Top-down linear, bottom-up linear, or single-ply restricted searches as configurable defaults.

d) Choice of globally-configurable defaults or a custom written walk in code library calls to acquire asset location by type.

e) Ability to call deep assets by specifying names to fill in type variables throughout the hierarchy, without using explicit string parsing on paths in the code or environment variables.

f) Inherent support for path-to-type lookup.

A simplified system and method for flexible path handling may include the following processes according to embodiments of the present invention. These processes are merely examples, which should not unduly limit the scope of the claims. One of ordinary skill in the art would recognize many variations, alternatives and modifications.

1) Setting-Up the System:
   a) An administrator establishes the hierarchal type-mapping schema, by creating the XML-based configuration file.
   b) Default search parameters are also set in the configuration file.
   c) The system may be used in custom code or 3rd party tools.

2) Using the System in Custom Code:
   a) Request a path by passing a type definition list (typename1=instance1, typename2=instance2, . . . ) to fill-in a hierarchy.
   Default search schema is used unless otherwise specified.
     i) If the specified request is specific enough, return the most specific path that matches according to the mapping configuration.
     ii) If the specified request does not contain enough information for a valid path search, return an error.
   b) Request a pair or hierarchal list from a path.
     i) If the path matches a possible path according to the mapping configuration, return the type definition list, (typename1=instance1, typename2=instance2 . . . ).
     ii) If the path is invalid, return an error.

3) Using the System in 3rd Party Tools:
   a) In one example, some or all the operations in process 2) are available through a callable program.
   b) In another example, the structure that is the same as that encoded in the flexpath configuration file is used in a 3rd party tool's configuration file.

According to one aspect of the invention, a method for a computer system is disclosed. One technique includes receiving a mapping schema between a plurality of asset-types within an asset-type hierarchy and a plurality of paths within an on-disk storage structure, and receiving an asset-type definition list from a user, wherein the asset-type definition list comprises an asset-type from the plurality of asset types. Techniques may also include determining at least one path from the plurality of paths for providing access to assets of the asset-type in response to the mapping schema and the asset-type definition list.

According to another aspect of the invention, a computer program product for a computer system including a processor is described. A computer program product may include code that directs the processor to receive a mapping schema between a plurality of asset-types organized in an asset-type hierarchy and a plurality of paths within an storage, and code that directs the processor to receive an asset-type definition list, wherein the asset-type definition list comprises an asset-type from the plurality of asset types. The codes may also include code that directs the processor to determine at least one path from the plurality of paths for providing access to assets of the asset-type in response to the mapping schema and the asset-type definition list. The codes typically reside on a tangible media such as an magnetic media, optical media, semiconductor media, or the like.

According to yet another aspect of the invention, a computer system is disclosed. One apparatus includes a memory configured to store a plurality of assets within a plurality of paths, and configured to store a mapping between a plurality of asset-types organized in a hierarchy and the plurality of paths. An apparatus also includes a processor coupled to the memory, wherein the processor is configured to receive an asset-type definition list, wherein the asset-type definition list comprises an asset-type from the plurality of asset types, and wherein the processor is configured to determine at least one path from the plurality of paths to provide access to assets of the asset-type in response to the mapping and the asset-type definition list.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
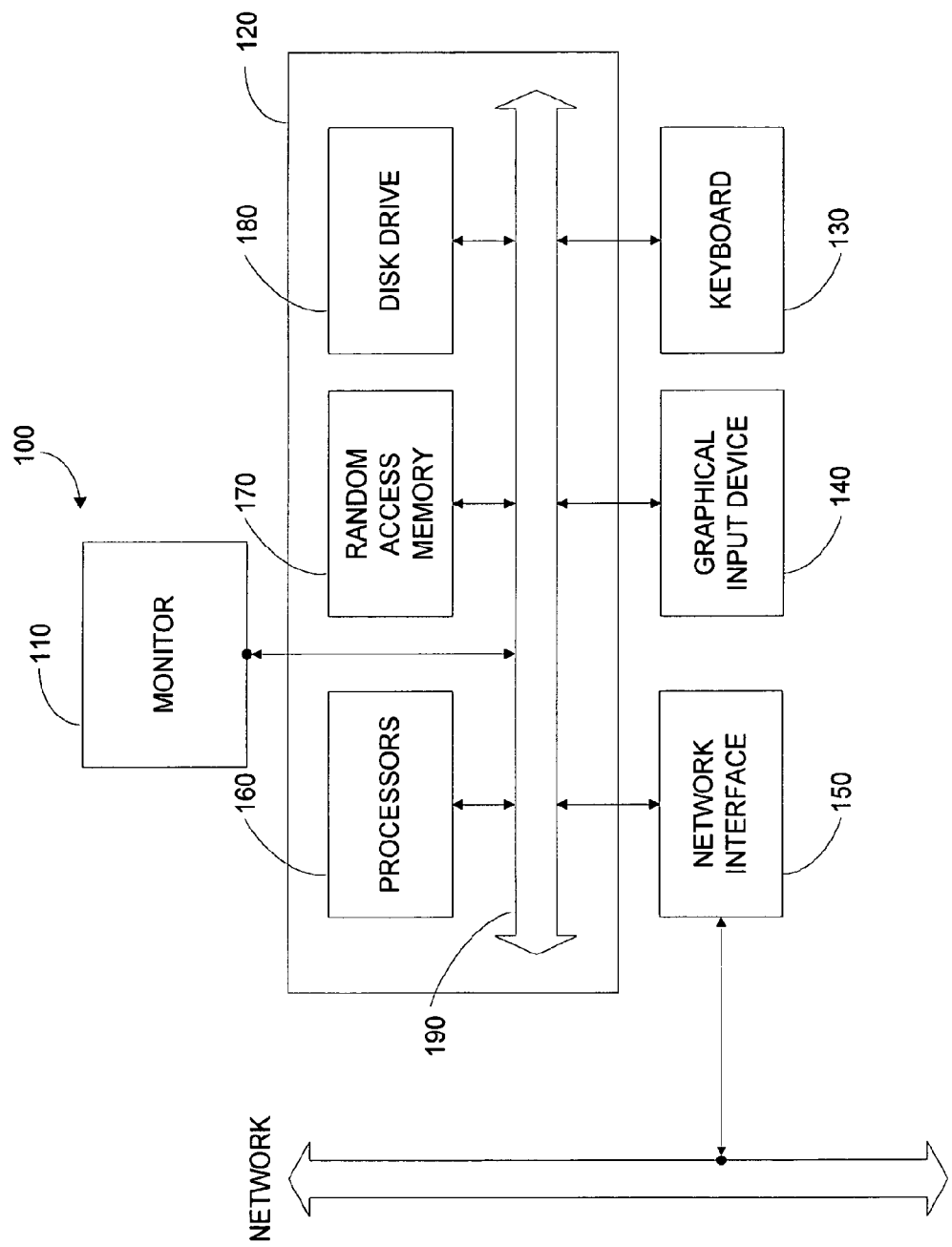
FIG. 1 illustrates a block diagram of a computer system according to one embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, a wireless remote, and the like. User input device 140 typically allows a user to select objects, icons, text, control points and the like that appear on the monitor 110. In some embodiments, monitor 110 and user input device 140 may be integrated, such as with a touch screen display or pen based display such as a Cintiq marketed by Wacom.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of animation asset data, audio/video files, computer programs, operating system, embodiments of the present invention, including an asset management tools, custom code, logical and aggregate animation assets, object data files, a dependency analyzer, dependency graphs, an operating system, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer systems capable of embodying the present invention. It will be readily apparent to one of ordinary skill in the art that many other hardware and software configurations are suitable for use with the present invention. For example, the use of other microprocessors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2:
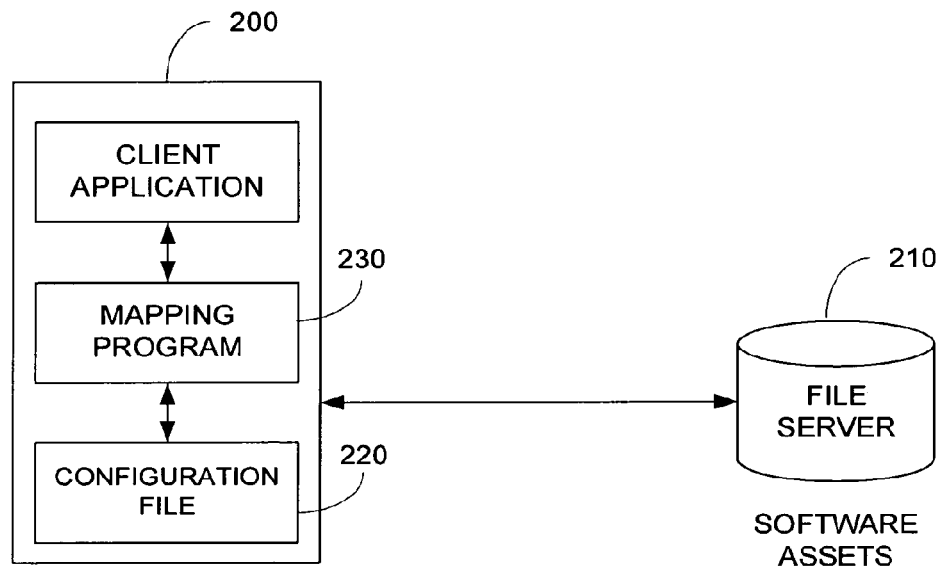
FIG. 2 illustrates a block diagram of an embodiment of the present invention.

FIG. 2 illustrates a block diagram of an embodiment of the present invention. Specifically, FIG. 2 illustrates a computer system 200 and a storage system 210. In various embodiments of the present invention, computer system 200 includes one or more computer systems 100, a configuration file 220 and a mapping program 230.

In embodiments of the present invention, computer system 200 retrieves a scene from storage system 210 based upon a geometric description of a scene, for a variety of different purposes (e.g. scene design, rendering).

Storage system 220, may include any organized and repeatable way to access the geometric description of a scene including animation assets such as object models, lighting models, camera models, and the like. For example, in one embodiment, storage system 220 includes a simple flat-directory structure on a local drive or a network drive, or the like. Additionally, locations of object models may be specified by absolute file path locations, relative file paths, specific directories, aliases, UNIX "symlinks" and the like.

In operation, to access a scene descriptor and/or data files referenced by the scene descriptor file, mapping program 230 is used to refer to configuration file 220 to locate one or more paths in storage system 210. Once the specified paths are identified, data files in that path or in sub-directories of the path can be retrieved.

In one embodiment of the present invention, a geometric scene descriptor is typically a text file that specifies the animation assets within the scene. Animation assets include lighting objects, camera objects, geometric objects, and the like. These objects are used to specify the scene. In the present embodiments, the scene descriptor file also specifies the position of objects in the scene, the orientation of objects, the colors and textures for the objects, properties for objects, and the like. In the present invention, the scene descriptor file is a textual file referred to as a "hook set" or "hook file." A scene descriptor file may be associated with only the frame, may be associated with a shot of images, may be associated with a portion of a feature, may be associated with the entire feature, or the like. In other embodiments, other types of representation of a scene descriptor can be used with embodiments of the present invention.

An example of the content of a simple hook file may include the following text references to a camera object, a light object, and a (three-dimensional) object:

hook "camera1" {properties of camera 1};
hook "light1" {properties of light 1};
hook "object1" {properties of object 1};

In one embodiment, for a camera object, properties may include: type of projection (e.g. perspective); field of view; width; position; azimuth; pitch, pan, and roll; aspect ratio; focusing option; cropping; shifting; tv aspect ratio, pan and scan option, number of tracks, number of cranes, and the like. An example of a portion of a camera hook is as follows:

hook "main_cam" {
desc=main_cam: production camera, aka camera01a;
kind=camera;
filename=stdobj/Camera01a.m; (filename of camera model) . . .

As seen in this example, reference to a file including a specification of a camera model is illustrated as a ".m" file. The .m file is accessed and used when rendering the scene using the camera object. In embodiments of the present invention, other file types for objects are contemplated, such as model files compatible with other three-dimensional creation and manipulation programs, such Maya, SoftImage, or the like.

In another embodiment, for a light object, properties may include: light quality, light type, light shape, light color, and the like. Not all camera objects or light objects need to support the same properties. For example, an "atmospheric fog light" may have a unique fog properties. An example of a portion of a lighting object hook is as follows:

hook "LP_Lspt_onPodium" {
use "stdlight/glight01a/glight01a.hook";
kind=light;
class=_Clsss_Glight01a;
macro=glight01a(name);
filename=stdlight/glight01a/glight01a.m; (filename of light model)

As seen in this example, reference to a file including a specification of a light model is also illustrated as a ".m" file. The .m file is accessed and used when rendering the light object in the scene.

In embodiments of the present invention, geometric objects may include three dimensional descriptions of objects, such as an animated character (e.g. Bob, Marlin, Woody), a prop (e.g. a table, a chair), and the like. Additionally, geometric objects may include virtually any imaginable properties supported. For example, one geometric parameter may be: number of wheels for an automobile object; number of eyeballs for a monster object, or other animation variable, and the like. Additionally, a geometric object may include references to files including physical models. An example of a portion of a geometric object hook is as follows:

hook "object1" {full_model="object1 full.mdl"; number_of_legs=4; standin_model="object1_standin.mdl"; number_of_legs=1; . . . }

In this example, a first geometric description file is specified "object1_full.mdl" and a second geometric description file is also specified "object1_standin.mdl." These respective .mdl files are accessed and used when rendering the geometric object in the scene. In the present embodiment, each model descriptor file is an industry standard .mdl file that specifies how object1 is to be rendered in the scene. In other embodiments, the model descriptor files may include procedurally generated geometric components, procedurally generated textures, and the like for object1. In still other embodiments, combinations of both pre-defined and procedurally generated aspects of object1 may be used.

Further, the .mdl files or the like typically store pre-defined geometric components, shaders, textures, colors, or the like. In embodiments of the present invention, assets may themselves be aggregate assets, for example, the geometric components may include references to other geometric components, a referenced shader may be an aggregate of other shaders, and the like.

The techniques illustrated above use representations of objects that are referenced at "hard coded" or relative computer locations, such as at specific computer disk directories, at specific network directories, with specific file names or aliases, or the like. In embodiments of the present invention, the examples above access files via the use of callable executables, centralized configuration files, and the like, described below.

Figure 3:
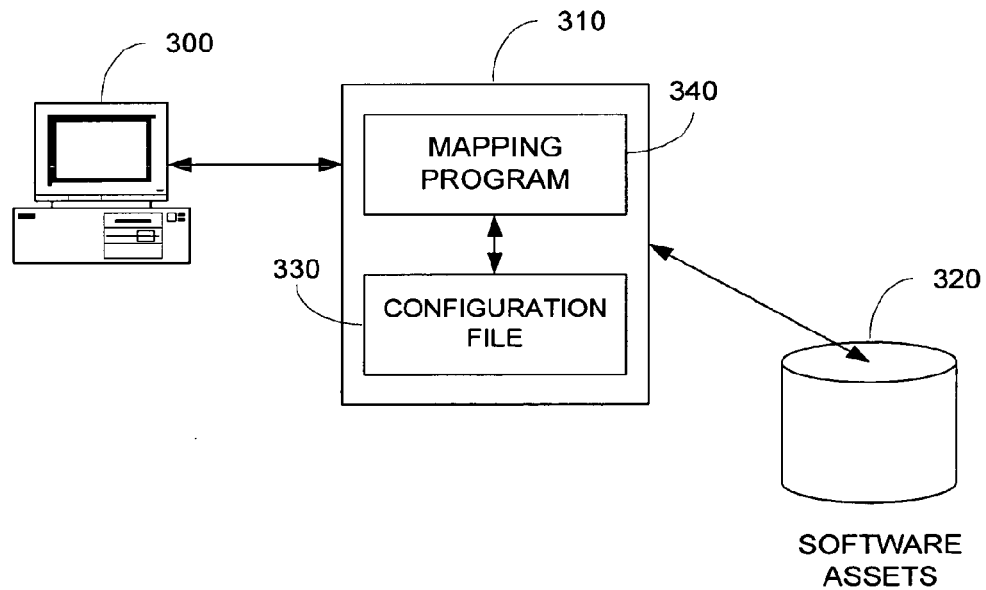
FIG. 3 illustrates another embodiment of the present invention.

FIG. 3 illustrates another embodiment of the present invention. More specifically, FIG. 3 illustrates a computer system coupled to a server.

FIG. 3 includes a computer system 300, a server 310, and a data store 320. In the present embodiment, computer system 300 and server 310 may be typical computer systems and data store 320 may be a network disk drive, or the like.

In the present embodiment, server 310 includes a centralized configuration file 330, and may include "asset management" software or the like. In various embodiment, server 310 may also include database management software that provides organized access to data store 320.

In operation, to access a scene descriptor and/or data files referenced by the scene descriptor file, mapping program 340 is used to refer to configuration file 330 to locate one or more specified locations in storage system 320. Once the specified path(s) are identified, data files at the path or in sub-directories of the path may be retrieved.

In operation, computer system 300 may retrieve a scene descriptor file from server 310. In such embodiment, the asset management software provides input to mapping program which in turn refers to centralized configuration file 330 to identify one or more specified paths in data store 320. Once the specified paths are identified, data files at the specified paths or in sub-directories may be retrieved or accessed by the asset management software.

Figure 4:
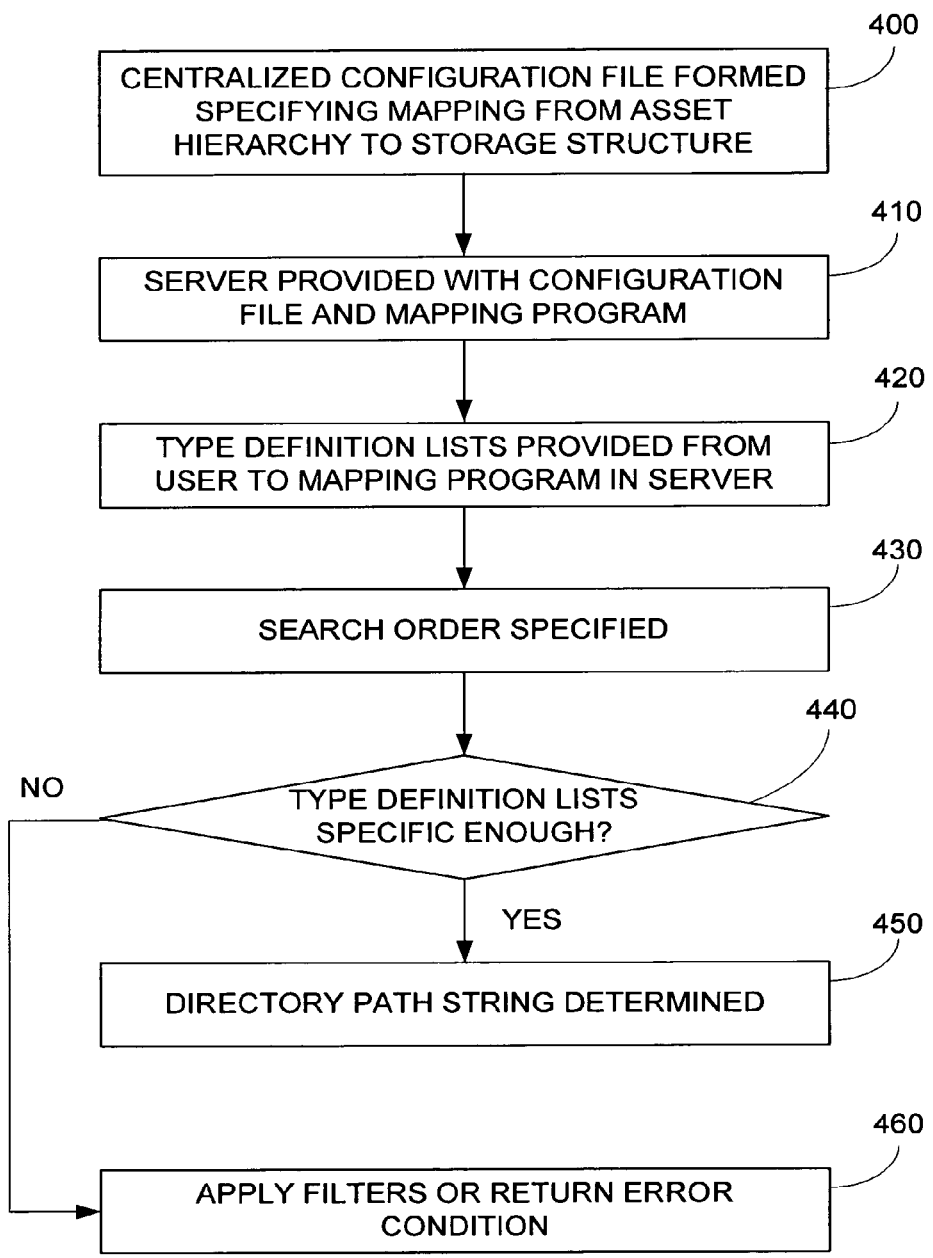
FIG. 4 illustrates a block diagram of a flow process according to an embodiment of the present invention.

FIG. 4 illustrates a block diagram of a flow process according to an embodiment of the present invention.

Initially, a centralized configuration file is created, step 400. In some embodiments of the present invention, the configuration file specifies a hierarchical mapping between on-disk structure and type and one or more asset trees having similar or different hierarchy. In the present embodiment, XML is used to specify configuration file. In other embodiments, any other representation of a map from on-disk structures to nodes may be used, including ASCII text file, or the like.

Figure 5:
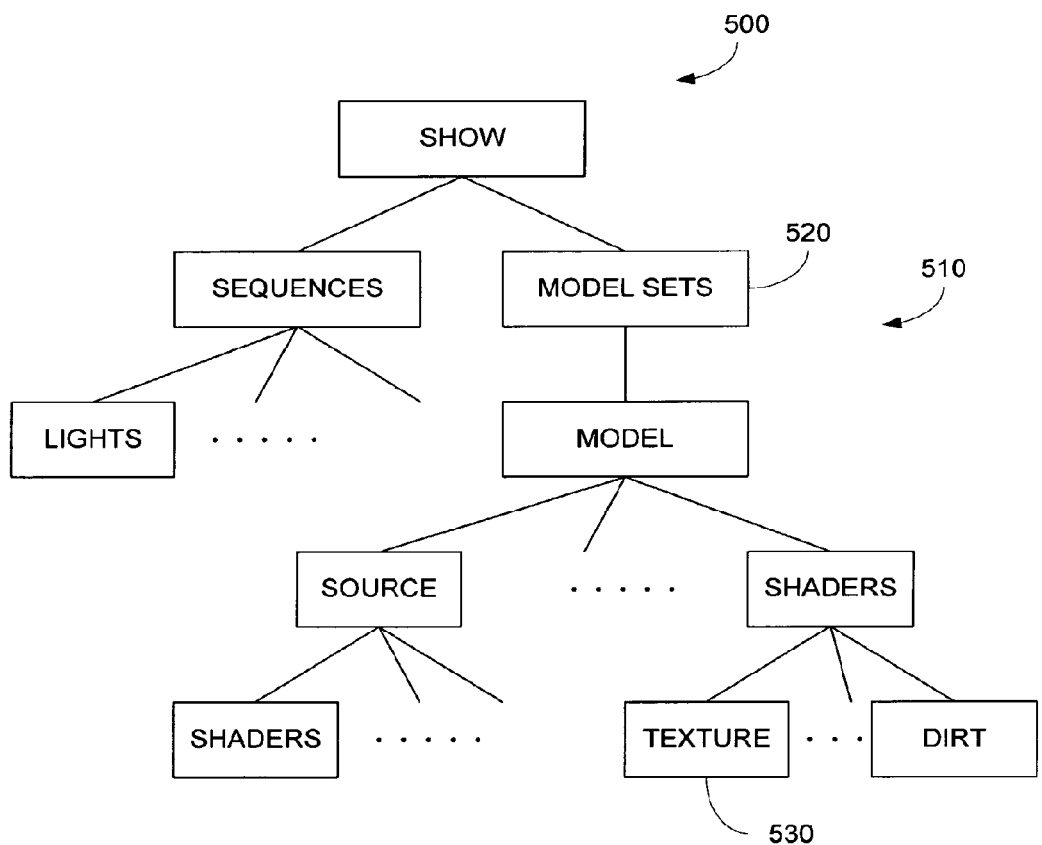
FIG. 5 illustrates an example according to embodiments of the present invention.

FIG. 5 illustrates an example according to embodiments of the present invention. More specifically, FIG. 5 illustrates an example of an asset tree 500 having a number of hierarchical-ordered nodes 510. Nodes 510 may include logical branch nodes, such as node 520, and leaf nodes, such as node 530. The hierarchy may be specified by a user of the model, such as an animator, a modeler, or the like. As illustrated, logical branch nodes may be compound or aggregate assets, such as for an entire animated feature, for specific shaders, or the like. In various embodiments, nodes 510 may be mapped to specific disk structures, e.g. directory paths, as specified in the configuration file.

In embodiments of the present invention, search-order among parallel nodes 510 may also be specified in the configuration file. For example, for "show", "sequence", and "shot" elements, locations for similar asset types can be specified to search from top down or bottom up order. As another example, the configuration file may be restricted to search only at a particular hierarchal level. In other examples, rules may be established that all subdirectories beneath a given root are of a named type of asset if they contain files, otherwise they are a collection of that named type of asst if not. Still further, default search parameters may also be set in the configuration file, for example, by using one of the three search-orders: top-down, bottom-up, or look 1 level only.

As illustrated in FIG. 4, in some embodiments of the present invention, a computer server is provided with the centralized configuration file, as well as a file access program mentioned above, step 410. In various embodiments, the file access program includes a number of application programming interfaces (APIs) that allow a user to specify parameters, such as asset names, asset types, asset version, context information, or the like. In other embodiments, the file access program may be part of a third-party program, such as asset management software.

Next, once the configuration file and APIs have been provided, a user searching for a particular asset path calls the APIs with specified search parameters, step 420. In various embodiments, the search parameters for the APIs include "type" definition lists (e.g. type_name_1="instance 1"; type_name_2="instance 2"). The type definition lists typically specify asset-types defined in the asset tree and instance names for the asset-types.

In embodiments of the present invention, contexts are also typically provided. Contexts also typically include one or more asset-types and instance names (e.g. setContext ([show="Toy Story", character="Woody", shot="Pizza Planet Entrance"]). In various embodiments, Contexts are provided to reduce the amount of data the user has to provide to the APIs. Contexts also allow the user to request path data without having to worry about where data is being retrieved from. Additionally, Contexts are provided so that different users can operate with the same APIs to access data that may have the same name, but are in different features, without rebooting the system.

In various embodiments, the user may also specify a search order that overrides a default search order, step 430. For example, an API parameter may include a search type parameter, such as search=search type 1; search=search type 2, or the like.

In embodiments of the present invention, in response to the user provided parameters, the computer attempts to determine one or more paths that match the defined parameters (mapping configuration), step 440.

In various embodiments, if the defined parameters are specific enough, and what is automatically returned is a directory path string with variables (specified search parameters) inserted into the directory path string, step 450. As an example, in an animated feature "Huey," a character named "Louie" is defined, and a character shader named "Dewy" is also defined. In such an example, the filled-in API parameters may include (shader=Dewy, character=Louie, movie=Huey). According to the embodiment discussed above, in return, the API returns the appropriate directory path, such as "/Huey/characters/Louie/shaders/Dewy"; "/movies/Huey/models/characters/main/Louie/components/shaders/Dewy"; or the like, depending upon the specific storage structure defined. In the present embodiments, a number of shaders may reside in sub-directories of the given path. For example, subdirectories may exist for the returned path, such as: "/Huey/characters/Louie/shaders/Dewy/Dirt"; "/Huey/characters/Louie/shaders/Dewy/texturemap"; "/Huey/characters/Louie/shaders/Dewy/scratches"; and the like.

In various embodiments, the APIs return the first matched path. In other embodiments, the APIs may return any matched paths. In such embodiments, various filters may also be used to narrow down the desired path.

In embodiments where the request is not specific enough to identify a path, an error condition may be returned, step 460. For example, using the example above, the filled-in API parameters may include (shader=Dewy, character=*, movie=Huey). Using this example, an error occurs because more than one result at the same level in the hierarchy may be returned. To reduce the number of error conditions, the path may be the "first-found" path; or all paths, if multiple paths are found. Additional filtering may also be used.

In some embodiments of the present invention, the user provides a disk path for one or more assets, and in return, the computer server returns the appropriate hierarchal list for the asset. For example, the user calls the APIs with a specified path. In response, a typed definition list (e.g. type_name_1="instance 1"; type_name_2="instance 2") is returned. Similar to above, in some cases more than one answer may be provided by the computer server. Accordingly, filters may be provided, error conditions may be flagged, and the like.

In some embodiments of the present invention, the APIs are called from within third-party programs, such as an asset management system, discussed above. The responses from the APIs may then serve as input to the asset management system. For example, the responses can be incorporated into configuration files for such third-party programs.

In one embodiment of the present invention, an example of two specific APIs are illustrated below. The psuedo code shown is merely an example, which should not unduly limit the scope of the claims. One of ordinary skill in the art would recognize many variations, alternatives and modifications.

In one embodiment, the API call for requesting a directory path is as follows:

getPath(asset_type,asset_name,version,context)

contexts may be specified as a list of context_type=context_name entries, otherwise the current context is assumed to be desired. In embodiments of the present invention, context may be specified by a user to designates any N branches in a hierarchy. Accordingly, the path returned from the getpath( ) command is dependent upon the branches defined in the context.

current version specified by the current user may be assumed unless otherwise specified (that is to say, latest==latest version for that user, accounting for any pins to files or labels they may have set).

"asset_name", "version", and "context" are optional parameters.

getPath ( ) returns: configuration defined path string of the requested path or error As examples:
getPath(shader, NULL, latest, [show=Bugs2, character=underminer,useLocal=only])
returns: /data/work/Bugs2/characters/underminer/shaders.

getPath(shot, h23_15, NULL, NULL)
returns: /shows/Bugs2/sequences/h23/shots/h23_15 (assuming current context specifies "show=Bugs2" and "useLocal=never").

getPath(shader,NULL,NULL,[show=Bugs2, character=underminer, useLocal=never])
returns: /shows/Bugs2/characters/underminer/shaders.

In one embodiment, the API call for requesting one or more directory paths is as follows:

findPaths(asset_type, asset_name, version, context, onlyfirst).

"context" is optional, and defaults to the current context.

onlyfirst specifies return only the first one (works similarly to using a toolpaths searchpath).

"asset_name", "version", "context", and "onlyfirst" are optional parameters.

findPaths ( ) returns: ordered list of path(s) where the requested asset(s) are found (similar to toolpaths search paths).

In various embodiments, if the requested asset type exists in more than one location in the tree and the associated asset tags have an order attribute, they may be returned in the specified order.

As examples: findPaths(character,underminer,NULL, NULL,0)
returns: /shows/Bugs2/characters/underminer/ and /data/local/characters/underminer An example of a configuration file is illustrated below. This configuration file is merely an example, which should not unduly limit the scope of the claims. One of ordinary skill in the art would recognize many variations, alternatives and modifications. The configuration file defines hierarchical relationships between assets, from which the path of an asset can be determined by looking in the tree at the node for that particular asset type, and then traversing the tree upward. Each parent node represents an asset container. In some embodiments, if each containing asset is specified in the context, its "name" is used as a directory name in the path. Otherwise, if the asset container node has a "name" attribute, that is used as the directory name. If the asset container node has no name attribute, and that asset is not specified in the context, an error may occur (since the path to the requested asset cannot be determined). If an asset has a source file associated with it, the source file should be a separate asset type, and should have its own location within the configuration file.

```
<show
globalbasepath="/shows/Bugs2"
localbasepath="/data/anim/Bugs2"
dbequivalent="unit">
  <characters name="characters" metatype="directory-based asset">
    <character
    metatype="model-based asset">
      <shaders name="shaders" metatype="directory-based asset">
        <shader toolpathentry="SHADERPATH(charDirs)"
        associatedtask="shading"
        metatype="file-based asset"/>
      </shaders>
      <shaderSources name="src" metatype="directory-based asset">
        <shaderSource metatype="model-based asset">
```
. . .

The name of the node is the asset's type.

globalbasepath—only valid at the root level, it defines the global base path for the show.

localbasepath—ditto for the local working tree. This functions as the default working path, overridden by the SHOWWORKPATH environmental variable.

metatype—the metatype tells what kind of thing the asset is, and can be used in logic; for example, characters, sets and props are all model based, so logic that operates on models can find out that these are model based and know that it can ask for model files.

dbequivalent—for backwards compatibility for mappings such as "unit" is "show" and (in some contexts) "prod" is "sequence."

toolpathentry—which toolpath entry to configure with the given path resolver logic.

associatedtask—a way of associating a workflow role with an asset and its path (for helping to configure the AB workflow engine, and also as a shortcut for getting task-specific paths).

name—Specifies the directory name that should be used for this asset. If unspecified, the name of an asset will be acquired from the context. This can be overridden by the context as well.

order—Specifies the order in which assets of the given type should be returned for calls to "findPaths". Assets that should be returned first should have 1 for the value of its order attribute.

Many changes or modifications are readily envisioned. In light of the above disclosure, one of ordinary skill in the art would recognize that many variations may be implemented based upon the discussed embodiments. Further, the embodiments discussed above may also be combined.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. In a computer system comprising physical storage for assets stored using file paths, wherein a file path is an indicator of how to request a file from a file system, a method of generating the file path for the file comprising:
   receiving, from a user, a request for the file path corresponding to the file, wherein the request does not provide a location in the physical storage;
   analyzing the request to identify an asset indicator, a type indicator and a pointer to a first type hierarchy data structure of the request, wherein the first type hierarchy data structure is distinct from a file system hierarchy of the physical storage;
   storing, in a memory of the computer system, a configuration file that specifies a mapping schema between the first type hierarchy data structure and the file system hierarchy;
   using the pointer to identify the first type hierarchy data structure from a plurality of type hierarchy data structures that each have a different node structure;
   searching the first type hierarchy data structure using the asset indicator and the type indicator to find an initial matching node that matches one of the asset indicator and the type indicator and then using the other one of the asset indicator and the type indicator to search sub-nodes of the initial matching node to find the final matching node;
   retrieving, from the configuration file, the mapping schema between the first type hierarchy data structure and the file system hierarchy for the type indicated by the type indicator, wherein the mapping schema is retrieved based on information obtained from the first type hierarchy data structure pointed to by the pointer in the request;
   evaluating the mapping schema using the final matching node to form the file path corresponding to the file in the file system hierarchy; and
   returning, to the user, the file path corresponding to the file, wherein the file path is usable to reference the file in the file system hierarchy.

2. The method of claim 1, wherein the mapping schema includes wildcard sequences.

3. The method of claim 1, wherein evaluating the mapping schema comprises a compound mapping such that more than one type of the type hierarchy is used such that the mapping schema depends on at least one type and at least one subtype of that type.

4. The method of claim 1, further comprising configuring a search module to allow for searches of the type hierarchy on a per-type or per-asset-tree to allow at least some asset collections to be searched top-down, bottom-up, or at a single level.

5. The method of claim 1, wherein each mapping schema is represented as a character string.

6. The method of claim 1, wherein the request comprises a type definition list that corresponds to nodes in the type hierarchy.

7. A computer program product resident on a non-transitory storage includes code executable by a computer processor, wherein the computer program product comprises:
   program code for receiving, from a user, a request for a file path corresponding to a file, wherein the request does not provide a location in the physical storage;
   program code for analyzing the request to identify an asset indicator, a type indicator and a pointer to a first type hierarchy data structure of the request, wherein the first type hierarchy data structure is distinct from a file system hierarchy of the physical storage;
   program code for storing, in a memory of a computer system, a configuration file that specifies a mapping schema between the first type hierarchy data structure and the file system hierarchy;
   program code for using the pointer to identify the first type hierarchy data structure from a plurality of type hierarchy data structures that each have a different node structure;
   program code for searching the first type hierarchy data structure using the asset indicator and the type indicator to find an initial matching node that matches one of the asset indicator and the type indicator and then using the other one of the asset indicator and the type indicator to search sub-nodes of the initial matching node to find the final matching node;
   program code for retrieving, from the configuration file, the mapping schema between the first type hierarchy data structure and the file system hierarchy for the type indicated by the type indicator, wherein the mapping schema is retrieved based on information obtained from the first type hierarchy data structure pointed to by the pointer in the request;
   program code for evaluating the mapping schema using the final matching node to form the file path corresponding to the file in the file system hierarchy; and
   program code for returning, to the user, the file path corresponding to the file, wherein the file path is usable to reference the file in the file system hierarchy.

8. The computer program product of claim 7, wherein the mapping schema includes wildcard sequences.

9. The computer program product of claim 7, wherein the program code evaluating the mapping schema comprises program code for processing a compound mapping such that more than one type of the type hierarchy is used such that the mapping schema depends on at least one type and at least one subtype of that type.

10. The computer program product of claim 7, further comprising program code for configuring a search module to allow for searches of the type hierarchy on a per-type or per-asset-tree to allow at least some asset collections to be searched top-down, bottom-up, or at a single level.

11. The computer program product of claim 7, wherein each mapping schema is represented as a character string.

12. The computer program product of claim 7, wherein the request comprises a type definition list that corresponds to nodes in the type hierarchy.

13. A computer system programmed to provide file paths for requesting files from a file system, comprising:
   a memory configured to store a plurality of type hierarchy data structures comprising a plurality of nodes, each corresponding to a type, wherein at least some of the plurality of nodes are connected to other nodes hierarchically;
   a processor coupled to the memory, wherein the processor is programmed to execute logic instructions;
   logic, executable by the computer system, for receiving, from a user, a request for a file path corresponding to a file, wherein the request does not provide a location in the physical storage;
   logic, executable by the computer system, for analyzing the request to identify an asset indicator, a type indicator and a pointer to a first type hierarchy data structure of the request, wherein the first type hierarchy data structure is distinct from a file system hierarchy of the physical storage;

logic, executable by the computer system, for storing, in a memory of the computer system, a configuration file that specifies a mapping schema between the first type hierarchy data structure and the file system hierarchy;

logic, executable by the computer system, for using the pointer to identify the first type hierarchy data structure from a plurality of type hierarchy data structures that each have a different node structure;

logic, executable by the computer system, for searching the first type hierarchy data structure using the asset indicator and the type indicator to find an initial matching node that matches one of the asset indicator and the type indicator and then using the other one of the asset indicator and the type indicator to search sub-nodes of the initial matching node to find the final matching node;

logic, executable by the computer system, for retrieving, from the configuration file, the mapping schema between the first type hierarchy data structure and the file system hierarchy for the type indicated by the type indicator, wherein the mapping schema is retrieved based on information obtained from the first type hierarchy data structure pointed to by the pointer in the request;

logic, executable by the computer system, for evaluating the mapping schema using the final matching node at least one parameter to form the file path corresponding to the file in the file system hierarchy; and logic, executable by the computer system, for returning, to the user, the file path corresponding to the file, wherein the file path is usable to reference the file in the file system hierarchy.

14. The computer system of claim 13, wherein the mapping schema includes wildcard sequences.

15. The computer system of claim 13, wherein the logic for evaluating the mapping schema comprises logic for processing a compound mapping such that more than one type of the type hierarchy is used such that the mapping schema depends on at least one type and at least one subtype of that type.

16. The computer system of claim 13, further comprising logic for configuring a search module to allow for searches of the type hierarchy on a per-type or per-asset-tree to allow at least some asset collections to be searched top-down, bottom-up, or at a single level.

17. The computer system of claim 13, wherein each mapping schema is represented as a character string.

18. The computer system of claim 13, wherein the request comprises a type definition list that corresponds to nodes in the type hierarchy.

19. The method of claim 1, wherein evaluating the mapping schema using the at least one parameter further comprises forming a plurality of file paths, wherein the plurality of file paths are returned.

20. The method of claim 1, wherein evaluating the mapping schema using the at least one parameter further comprises forming a plurality of file paths, wherein one file path of the plurality of file paths is returned.

\* \* \* \* \*